(12) United States Patent
Leeb et al.

(10) Patent No.: US 10,021,214 B2
(45) Date of Patent: Jul. 10, 2018

(54) SYNTHETIC TRANSACTIONS BETWEEN COMMUNICATION ENDPOINTS

(71) Applicant: Microsoft Technology Licensing, LLC, Redmond, WA (US)

(72) Inventors: Gunter Leeb, Redmond, WA (US); Pascal F. Menezes, Bellevue, WA (US); Jon R. Morrow, Snoqualmie, WA (US); William N. Hanlon, Bellevue, WA (US); John Hillary Zybura, Seattle, WA (US); Amer A. Hassan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 45 days.

(21) Appl. No.: 14/337,857

(22) Filed: Jul. 22, 2014

(65) Prior Publication Data
US 2016/0028854 A1 Jan. 28, 2016

(51) Int. Cl.
| | |
|---|---|
| *G06F 15/16* | (2006.01) |
| *H04L 29/06* | (2006.01) |
| *H04W 24/06* | (2009.01) |
| *H04L 29/08* | (2006.01) |
| *H04L 12/58* | (2006.01) |

(52) U.S. Cl.
CPC .......... *H04L 67/38* (2013.01); *H04L 51/36* (2013.01); *H04L 67/10* (2013.01); *H04L 67/42* (2013.01); *H04W 24/06* (2013.01)

(58) Field of Classification Search
CPC ..... H04L 43/0888; H04L 43/16; H04L 45/22; H04L 49/552; H04L 51/02; H04L 51/18; H04L 51/20; H04L 51/32; H04L 61/106; H04L 61/1511; H04L 65/601; H04L 65/604; H04L 65/80; H04L 67/04; H04L 67/10; H04L 67/38; H04L 67/42;
(Continued)

(56) References Cited

U.S. PATENT DOCUMENTS

| 7,979,496 B2 | 7/2011 | Shankar et al. | |
|---|---|---|---|
| 2004/0030747 A1* | 2/2004 | Oppermann | G06F 11/3414 709/203 |

(Continued)

FOREIGN PATENT DOCUMENTS

| EP | 1448004 | 8/2004 |
|---|---|---|
| WO | WO-2006099473 | 9/2006 |

OTHER PUBLICATIONS

Tango/04 Computing Group Business Service Management (BSM) technology Version:1.52 Dec. 2007, "End-To-End Service Level Monitoring with Synthetic Transactions".*
(Continued)

*Primary Examiner* — David Lazaro
*Assistant Examiner* — Berhanu Shitayewoldetadik

(57) ABSTRACT

Techniques for synthetic transactions between communication endpoints are described. According to various embodiments, a synthetic transaction represents a simulation of a communication session between different communication endpoints. In at least some embodiments, performance attributes of a synthetic transaction may be recorded during various stages of the synthetic transaction. Based on the performance attributes, various actions may be taken to mitigate errors and optimize communication session performance.

20 Claims, 10 Drawing Sheets

(58) Field of Classification Search
CPC ......... H04L 29/06; H04L 29/08; H04L 67/10;
H04L 709/203
USPC .................................................. 709/203–245
See application file for complete search history.

(56) References Cited

U.S. PATENT DOCUMENTS

| | | | |
|---|---|---|---|
| 2007/0026854 A1 | 2/2007 | Nath et al. | |
| 2007/0266148 A1* | 11/2007 | Ruiz ................... | H04L 12/2697 709/224 |
| 2008/0080536 A1 | 4/2008 | Chhaya et al. | |
| 2009/0094492 A1 | 4/2009 | Music et al. | |
| 2009/0144409 A1* | 6/2009 | Dickerson ........... | G06F 11/3495 709/224 |
| 2009/0225670 A1* | 9/2009 | Leung .................. | H04L 41/022 370/252 |
| 2009/0275414 A1* | 11/2009 | Lee ........................ | A63F 13/12 463/42 |
| 2010/0302345 A1* | 12/2010 | Baldino ................ | G06Q 10/10 348/14.08 |
| 2011/0004926 A1* | 1/2011 | O'Donnell, III ...... | G06F 21/305 726/7 |
| 2011/0287788 A1* | 11/2011 | McGary ................. | H04L 51/18 455/466 |
| 2012/0023236 A1* | 1/2012 | Backholm ............... | H04L 47/20 709/226 |
| 2013/0254412 A1 | 9/2013 | Menezes et al. | |
| 2014/0136718 A1 | 5/2014 | Menezes et al. | |

OTHER PUBLICATIONS

"International Search Report and Written Opinion", Application No. PCT/US2015/040673, dated Oct. 9, 2015, 12 Pages.
"Polycom® Professional Services", Available at: <http://www.polycom.com/content/dam/polycom/common/documents/brochures/professional-services-br-enus.pdf>, Apr. 7, 2014, 23 Pages.
"End-to-End Monitoring for Microsoft Lync", Retrieved From: <http://www.unifysquare.com/microsoft-lync-monitoring/powermon> Jun. 26, 2014, 2014, 3 Pages.
"Cisco Unified Operations Manager 2.3", Available at: <http://www.cisco.com/c/en/us/products/collateral/cloud-systems-management/prime-unified-operations-manager/data_sheet_c78-587518.pdf> Jun. 26, 2014, 2010, 6 Pages.
"Cisco Unified Operations Manager 8.0 Deployment Best Practices", Retrieved From: <http://www.cisco.com/c/en/us/products/collateral/cloud-systems-management/prime-unified-operations-manager/deployment_guide_c07-629357.html> Jun. 26, 2014, 2010, 65 Pages.
"VoIP Testing Tools", Retrieved From: <http://www.tmcnet.com/voip/0506/tech-roundup-voip-testing-tools.htm> Jun. 26, 2014, Aug. 24, 2006, 9 pages.
Robinson, "SolarWinds Strengthens VoIP Performance Monitoring and Proactive WAN Performance Analysis", Retrieved From: <http://www.ucstrategies.com/news-analysis/solarwinds-strengthens-voip-performance-monitoring-and-proactive-wan-performance-analysis-in-its-leading-network-management-portfolio.aspx> Jun. 26, 2014, Aug. 7, 2012, 3 Pages.
"Second Written Opinion", Application No. PCT/US2015/040673, dated Jun. 16, 2016, 6 pages.
"International Preliminary Report on Patentability Issued in PCT Application No. PCT/US2015/040673", dated Sep. 29, 2016, 10 Pages.
"Office Action Issued in European Patent Application No. 15750166.9", dated Dec. 6, 2017, 8 Pages.
"Office Action Issued in Chilean Patent Application No. 127-2017", dated Apr. 16, 2018, 7 Pages.
"Office Action Issued in Colombian Patent Application No. NC2017/0000373", dated Mar. 26, 2018, 32 Pages.

* cited by examiner

SYNTHETIC TRANSACTIONS BETWEEN COMMUNICATION ENDPOINTS

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication (UC) systems.

While UC systems provide for increased flexibility in communications, they also present a number of implementation challenges. For instance, a UC system typically utilizes multiple interconnected networks to route various communications. Since different networks may be managed by different entities, challenges thus arise in maintaining communications quality for communications that are routed among independently managed networks. Further, UC is typically implemented via software that can be loaded on mobile devices, e.g., tablets, smartphones, laptops, and so forth. Thus, techniques for managing UC&C communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for synthetic transactions between communication endpoints are described. According to various embodiments, a synthetic transaction represents a simulation of a communication session between different communication endpoints. In at least some embodiments, performance attributes of a synthetic transaction may be recorded during various stages of the synthetic transaction. Based on the performance attributes, various actions may be taken to mitigate errors and optimize communication session performance.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
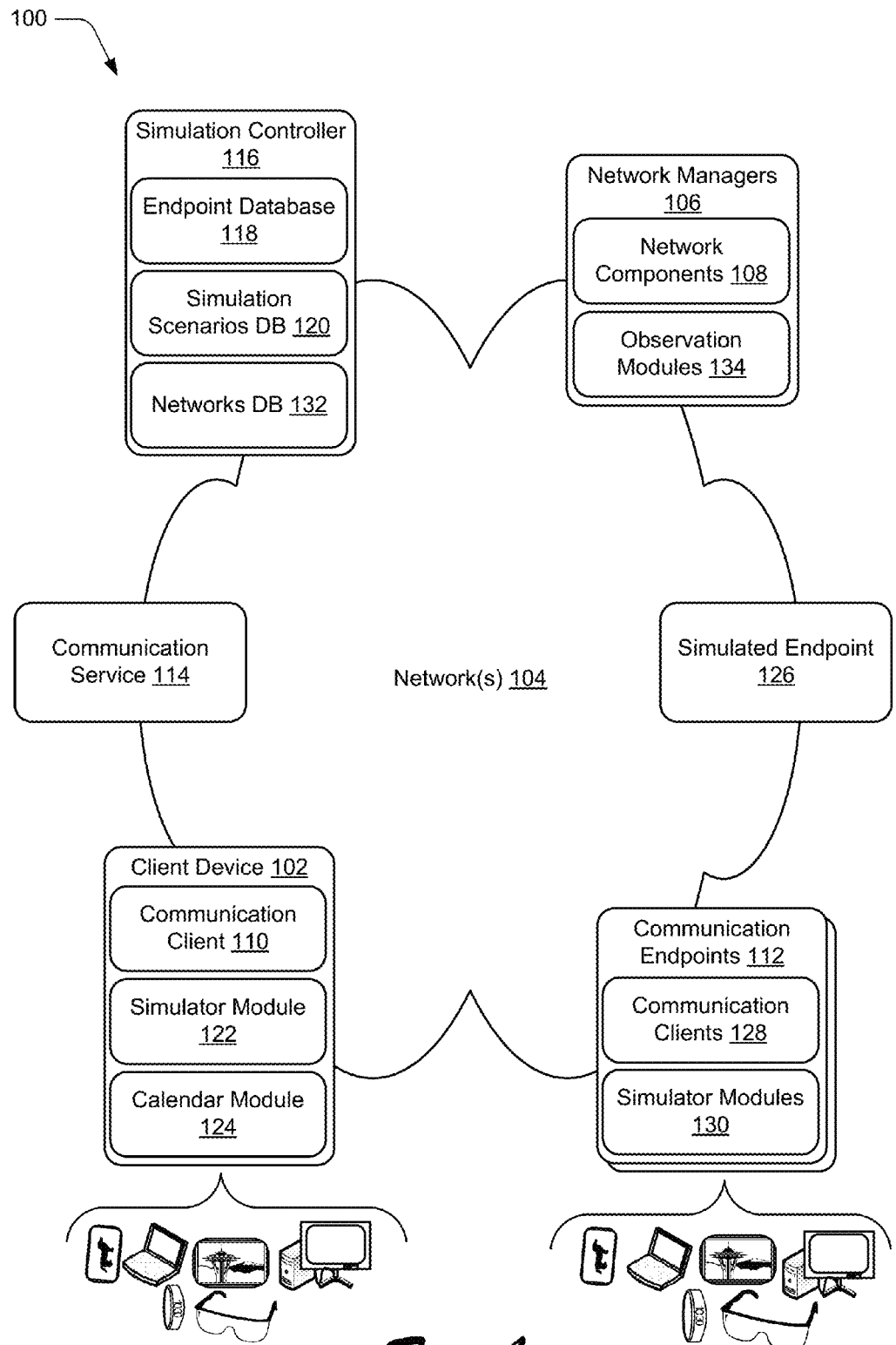
FIG. 1 is an illustration of an environment in an example implementation that is operable to employ techniques discussed herein.

Techniques for synthetic transactions between communication endpoints are described. According to various implementations, a synthetic transaction represents a simulation of a communication session between different communication endpoints. Generally, a "communication endpoint" refers to various devices that may communicate via exchange of communication media, such as voice data, video data, content sharing, and combinations thereof.

A communication session refers to an exchange of communication media between communication endpoints, such as part of a real-time communication session between users of different communication endpoints. Examples of a communication session include a Voice over Internet Protocol (VoIP) call, a video call, text messaging, a file transfer, and/or combinations thereof. In at least some embodiments, a communication session represents a Unified Communications (UC) session. Thus, a synthetic transaction simulates conditions of an actual communication session without requiring users to be present to input communication media.

According to various implementations, a simulation scenario is generated that includes various transaction parameters for a synthetic transaction. Examples of such transaction parameters include identifiers for communication endpoints, media types, device settings, and so forth, to be applied and/or simulated as part of a synthetic transaction. Generally, the simulation scenario can simulate different communication session types and/or conditions, such as person-to-person calls, conference calls, multicast calls, and so forth. A synthetic transaction can be performed between different communication endpoints and based on the transaction parameters.

According to various implementations, a synthetic transaction can be performed in response to various trigger events. For instance, a synthetic transaction may be performed in response to user input to initiate the synthetic transaction, such as to determine communication quality between different communication endpoints.

In another example, a synthetic transaction may be triggered in response to detecting an upcoming scheduled communication session, such as part of an upcoming calendar event. For instance, a calendar application may include an entry for a calendar event that specifies a call between particular communication endpoints. Thus, techniques discussed herein may be employed to generate a simulation scenario that simulates various parameters of the scheduled communication session. The simulation scenario may be employed to perform a synthetic transaction prior to the scheduled communication session, such as to ascertain expected call quality that may be experienced during the upcoming communication session. If session problems are detected during the synthetic transaction, corrective measures may be taken to improve quality of the upcoming communication session.

In yet another example, periodic synthetic transactions may be scheduled to periodically test communication quality between different communication endpoints and/or over different communication paths.

According to various implementations, performance attributes of a synthetic transaction may be recorded during various stages of the synthetic transaction. The performance attributes, for instance, may indicate call quality and/or errors that occur during the synthetic transaction. Based on the performance attributes, various actions may be taken to mitigate errors and optimize communication session performance. For instance, the performance attributes can be communicated to different entities involved in the synthetic transaction, such as network managers, communication services, end-user devices, and so forth. The respective entities may implement various corrective and optimization procedures based on the performance attributes.

In the following discussion, an example environment is first described that is operable to employ techniques described herein. Next, a section entitled "Synthetic Transaction Parameters and Observations" discusses some example ways for communicating parameters for and observations of synthetic transactions. Following this, a section entitled "Example Implementation Scenarios" describes some example implementation scenarios in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for synthetic transactions between communication endpoints described herein. Generally, the environment 100 includes various devices, services, and networks that enable communication via a variety of different modalities. For instance, the environment 100 includes a client device 102 connected to a network 104. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The network 104 is representative of various types and combinations of wired and wireless networks, such as wide area networks (WANs), local area networks (LANs), the Internet, and so forth. The network 104 may provide the client device 102 with connectivity via a variety of different connectivity technologies, such as broadband cable, digital subscriber line (DSL), cellular, wireless data connectivity (e.g., WiFi™), T-carrier (e.g., T1), Ethernet, and so forth.

The networks 104 are provided and/or managed by network managers 106, which are representative of different entities that provide infrastructure and administration of the networks 104. The network managers 106, for instance, provide and maintain network components 108, which are representative of hardware and logic for implementing the networks 104. Examples of the network components 108 include gateways, switches, routers, hubs, wireless access points, network elements, and so forth.

The client device 102 includes a communication client 110, which is representative of functionality to enable communication between the client device 102 and communication endpoints 112. Generally, the communication client 110 is representative of functionality to enable different forms of communication via the client device 102. Examples of the communication client 110 include a voice communication application (e.g., a VoIP client), a UC client, a video communication application, a messaging application, a content sharing application, and combinations thereof. The communication client 110, for instance, enables different communication modalities to be combined to provide diverse communication scenarios. In at least some implementations, the communication client 110 represents an application that is installed on the client device 102. Additionally or alternatively, the communication client 110 can be implemented as a portal to a remote application, such as accessed via a web browser, a web application, and so forth.

The environment 100 further includes a communication service 114, which is representative of a service to perform various tasks for management of communication between the client device 102 and the communication endpoints 112. The communication service 114, for instance, can manage initiation, moderation, and termination of communication sessions. Examples of the communication service 114 include a VoIP service, an online conferencing service, a UC service, and so forth. In at least some embodiments, the communication service 114 may be implemented as or be connected to a private branch exchange (PBX) in communication with a Public Switched Telephone Network ("PSTN") to enable voice communication between the client device 102 and the communication endpoints 112.

In at least some implementations, the communication client 110 is managed and/or hosted by the communication service 114. For instance, the communication client 110 represents an interface to communication services provided by the communication service 114.

The environment 100 further includes a simulation controller 116, which is representative of functionality to perform various aspects of techniques for synthetic transactions between communication endpoints discussed herein. The simulation controller 116, for instance, can implement synthetic communication transactions ("synthetic transactions") that simulate various communication scenarios between the client device 102 and other communication endpoints, such as the communication endpoints 112. In at least some implementations, the simulation controller 116 is implemented by the communication service 114 to manage various aspects of communication quality between different communication endpoints.

The simulation controller 116 includes an endpoint database (DB) 118 and a simulation scenarios database (DB) 120. The endpoint DB 118 stores information about different communication endpoints, such as the client device 102, the communication endpoints 112, and so forth. For instance, the endpoint DB 118 correlates identifiers for different endpoints with results of simulated transactions that involve the endpoints. The simulation scenarios DB 120 stores simulation parameters and attributes that can be used to generate different synthetic transactions. Further details concerning the endpoint DB 118 and the simulation scenarios DB 120 are discussed below.

According to one or more implementations, the simulation controller 116 interfaces with a simulator module 122 on the client device 102 to enable different synthetic transactions to be implemented. For instance, based on a simulation scenario from the simulation scenarios DB 120, the simulation controller 116 communicates transaction parameters to the simulator module 122. The simulator module 122 may then use the transaction parameters to implement a synthetic transaction, such as to simulate a communication session between the client device 102 and one of the communication endpoints 112.

The client device 102 further includes a calendar module 124, which is representative of functionality to manage event scheduling tasks for the client device 102. For instance, a user of the client device 102 may utilize the calendar module 124 to create and/or manage different events, such as meetings, appointments, personal events, and so forth. In at least some implementations, the calendar module 124 may be implemented as part of a software application and/or service that enables a user to create events, receive invitations for events from other users, receive reminders regarding upcoming events, and so forth. As further detailed below, the simulator module 122 and/or the simulation controller 116 may interface with the calendar module 124 to detect an upcoming scheduled communication session. A synthetic transaction may then be implemented to simulate various parameters of the scheduled communication session, such as to detect potential quality attributes of the communication event.

The environment 100 further includes a simulated endpoint 126, which is representative of functionality to simulate a communication endpoint. For instance, the simulated endpoint 126 may be implemented as a logical representation of an end-user device with which synthetic transactions may be performed. The simulation controller 116, for example, may implement a synthetic transaction between the client device 102 and the simulated endpoint 126 to simulate different conditions that may occur as part of a communication session. In at least some implementations, the simulated endpoint 126 is configured to engage in a synthetic transaction with the client device 102 and/or other communication endpoint independent of user input to the simulated endpoint 126.

The communication endpoints 112 are representative of devices and/or functionalities with which the client device 102 may communicate. The communication endpoints 112 include respective communication clients 128 and simulator modules 130. According to various implementations, the simulation controller 116 can communicate various instructions and/or simulation parameters to the simulator module 122 of the client device 102, and to a simulator module 130 of a particular communication endpoint 112. Based on the instructions and parameters, a synthetic transaction may be implemented between the client device 102 and the communication endpoint 112. Performance attributes of the synthetic transaction can be logged to ascertain communications quality between the client device 102 and the communication endpoint 112.

According to one or more embodiments, the simulation controller 116 includes connectivity and logic that accesses routing information for communications between the client device 102 and the communication endpoints 112. For instance, the simulation controller 116 can access an Interior Gateway Protocol (IGP) and/or spanning tree switching topology for the networks 104, e.g., for the network components 108. This enables the simulation controller 116 to identify different network components 108 that are involved in routing synthetic transaction data, and to identify particular network components 108 that may cause various performance-related phenomena detected as part of a synthetic transaction. According to various implementations, the simulation controller 116 stores performance attributes of different networks 104 and/or network components 108 as part of a networks database (DB) 132.

The networks DB 132, for instance, indicates performance data for individual networks 104 and/or network components 108, such as indications of data flow quality across the individual networks and/or components. For example, individual of the networks 104 and/or network components 108 can be characterized in the networks DB 132 based on historical quality metrics, such as detected as part of synthetic transactions that involve particular networks 104. In at least some implementations, the simulation controller 116 maintains active state awareness of the networks 104 via the networks DB 132 and based on session quality attributes of different networks 104 and/or network components 108 that are detected as part of a synthetic transaction. In at least some embodiments, data from the networks DB 132 can be provided to the network managers 106 to enable particular network components 108 to be reconfigured, repaired, or replaced to increase communication quality across various communication paths of the networks 104.

According to various implementations, the network managers 106 maintain observation modules 134, which are representative of functionality to observe and record behaviors that occur within the networks 104. For instance, an individual network manager 106 may maintain an observation module 134 that observes and records performance attributes of data flows for a synthetic transaction that occur across a respective network 104. The observation modules 134 may propagate behavior information for respective networks 104 and/or network components 108 to the simulation controller 116 to be stored by the networks DB 132. In at least some implementations, the observation modules 134 may be deployed and/or hosted in their respective networks 104 by the simulation controller 118.

The various entities and functionalities discussed in the environment 100 may be implemented in software, hardware, firmware, and/or combinations thereof. Further details and implementations of the various entities of the environment 100 are discussed below.

Having described an example environment in which the techniques described herein may operate, consider now a discussion of example ways of propagating various attributes of communication sessions in communication systems in accordance with one or more embodiments.

Synthetic Transaction Parameters and Observations

According to various implementations, techniques can be employed to generate simulation scenarios for synthetic transactions with a wide variety of different parameters. For instance, notification events can be generated that specify various transaction parameters to be applied as part of synthetic transactions. The notification events can be conveyed to different entities to be used to implement synthetic transactions according to techniques for synthetic transactions between communication endpoints discussed herein.

In at least some embodiments, notification events can be configured using a simulation application programming interface (API) that can be leveraged to configure and communicate parameters for synthetic transactions to various entities, e.g., to the simulator module 122 of the client device 102. Consider, for instance, the following parameters that may be conveyed via notification events:

(1) Media Type: This parameter can be used to specify a media type and/or types that are to be transmitted and/or simulated as part of a synthetic transaction. Examples of media type include voice data (e.g., audio), video, content, and combinations thereof.

(2) Initiator Address(es): This parameter can be used to specify addresses for endpoints that are to initiate a synthetic transaction. Examples of addresses include media access control (MAC) addresses, Internet protocol (IP) addresses, usernames, phone numbers, and so forth.

(3) Recipient Address(es): This parameter can be used to specify addresses for endpoints that are to "called" as part of a synthetic transaction. In at least some implementations, multiple recipient addresses can be indicated, such as for conference calls, multicast communication events, and so forth.

(4) Codecs: This parameter can be used to specify a codec/codecs to be used to implement a synthetic transaction.

(5) Communication Client Settings: This parameter can be used to specify various communication client settings to be applied and/or simulated as part of a synthetic transaction.

(6) Quality of Service: This parameter can be used to specify quality of service (QoS) to be applied to communication media as part of a synthetic transaction. The attribute, for instance, can specify QoS markings to be applied to communication media. Examples of QoS markings include best effort (BE), expedited forwarding (EF), assured forwarding (AF), and so forth.

(7) Transaction Routing: This parameter can be used to specify specific routes to be used as part of a synthetic transaction. A route, for instance, can be specified in terms of specific instances of network components, such as specific gateways, servers (e.g., UC servers), UC networks, and so forth.

(8) Transaction Type: This parameter can be used to specify different transaction types, such as calls between two devices, conference calls, call multi-forking, multi-cast calls, and so forth.

(9) Transaction Behaviors: This parameter can be used to specify different behaviors that may occur during and/or as part of a transaction, such as user-initiated behaviors, communication service behaviors, device behaviors, and so forth. Examples of transaction behaviors include selection of different communication options, such as placing a call on hold, adjustment of call volume, selecting a call recording option, transferring a call to a different user and/or device, and so forth.

(10) Transaction Timing: This parameter can be used to specify various temporal parameters of a synthetic transaction, such as a date and/or time when a synthetic transaction is to be initiated, a time duration for a synthetic transaction, timing for particular events that occur during a synthetic transaction, and so forth.

These transaction parameters are presented for purpose of example only, and it is to be appreciated that a wide variety of different parameters not expressly mentioned herein may additionally or alternatively be employed in accordance with the claimed implementations.

In at least some embodiments, notification events can be generated that identify behaviors that are observed as part of synthetic transactions. Notification events, for instance, can be configured using an observations API that can be leveraged to communicate synthetic transaction behaviors that are observed to various entities. For example, the observations API can identify dialogue events and session events for which attributes of a synthetic transaction can be identified. The observations API, for instance, may represent an extension or alternative to the simulation API detailed above. Consider, for instance, the following events and attributes that may be conveyed via a notification event:

Dialogue Events—These events apply to various portions of a synthetic transaction, such as the start, update, and end of a synthetic transaction. A dialogue event can include one or more of the following example attributes.

(1) Timestamp: This attribute can be leveraged to specify timestamps for a start of a synthetic transaction, updates that occur during a synthetic transaction, and an end (e.g., termination) of a synthetic transaction.

(2) Source IP Address: This attribute can be leveraged to specify an IP address for an endpoint that is a source of media during a synthetic transaction, e.g., a device that initiates a synthetic transaction.

(3) Destination IP Address: This attribute can be leveraged to specify an IP address for an endpoint that is to receive media as part of a synthetic transaction.

(4) Transport Type: This attribute can be leveraged to specify a transport type or combination of transport types for a synthetic transaction. Examples of transport types include Transmission Control Protocol (TCP), User Datagram Protocol (UDP), and so forth.

(5) Source Port: this attribute can be leveraged to specify an identifier for a port at a source endpoint, e.g., a source device identified by the Source IP Address referenced above.

(6) Destination Port: This attribute can be leveraged to specify an identifier for a port at a destination endpoint, e.g., a destination device identified by the Destination IP Address referenced above.

(7) Media Type: This attribute can be leveraged to specify a media type and/or types that are to be transmitted and/or are being transmitted as part of a synthetic transaction. As discussed elsewhere herein, a synthetic transaction can involve multiple different types of media. Thus, the Media Type attribute can be employed to identify media types that are exchanged as part of a synthetic transaction.

(8) Bandwidth Estimation: This attribute can be leveraged to specify an estimated bandwidth that is allocated as part of a synthetic transaction.

(9) To: This attribute can be leveraged to identify a user to which media in a synthetic transaction is transmitted.

(10) From: This attribute can be leveraged to identify a user from which media synthetic transaction is transmitted.

(11) Error Code: This attribute can be leveraged to specify various error codes for errors that may occur as part of a synthetic transaction. For example, errors can include errors that occur during initiation of a synthetic transaction, errors that occur during a synthetic transaction, errors that occur when a synthetic transaction is terminated, and so forth.

Transaction Performance Events—These events can be generated and applied to specify various behaviors and performance parameters that are observed as part of a synthetic transaction. A transaction performance event may include one or more of the attributes discussed above with reference to Dialogue Events, and may also include one or more of the following attributes.

(1) Mean Opinion Score (MOS) Degradation: This attribute can be leveraged to specify a MOS for a synthetic transaction. The attribute, for instance, can be used to indicate an overall quality metric for a synthetic transaction.

(2) Jitter Inter-Arrival Time: This attribute can be leveraged to specify jitter values for a synthetic transaction.

(3) Packet Loss Rate: This attribute can be leveraged to specify a packet loss rate for a synthetic transaction.

(4) Round Trip Delay (RTD): This attribute can be leveraged to specify RTD values for packets in synthetic transaction.

(5) Concealment Ratio: This attribute can be leveraged to indicate an observed cumulative ratio of concealment time over speech time observed for a synthetic transaction.

Thus, various notifications discussed herein can include one or more of the attributes discussed above and can be used to propagate the attributes to various entities. This list of attributes is not exhaustive, and it is to be appreciated that a wide variety of other attributes may be communicated in accordance with the claimed embodiments.

Having described an example ways of propagating parameters and observed behaviors of synthetic transactions, consider now some example implementation scenarios for synthetic transactions between communication endpoints in accordance with one or more embodiments.

Example Implementation Scenarios

The following section describes example implementation scenarios for synthetic transactions between communication endpoints in accordance with one or more embodiments. The implementation scenarios may be implemented in the environment 100 discussed above, and/or any other suitable environment.

Figure 2:
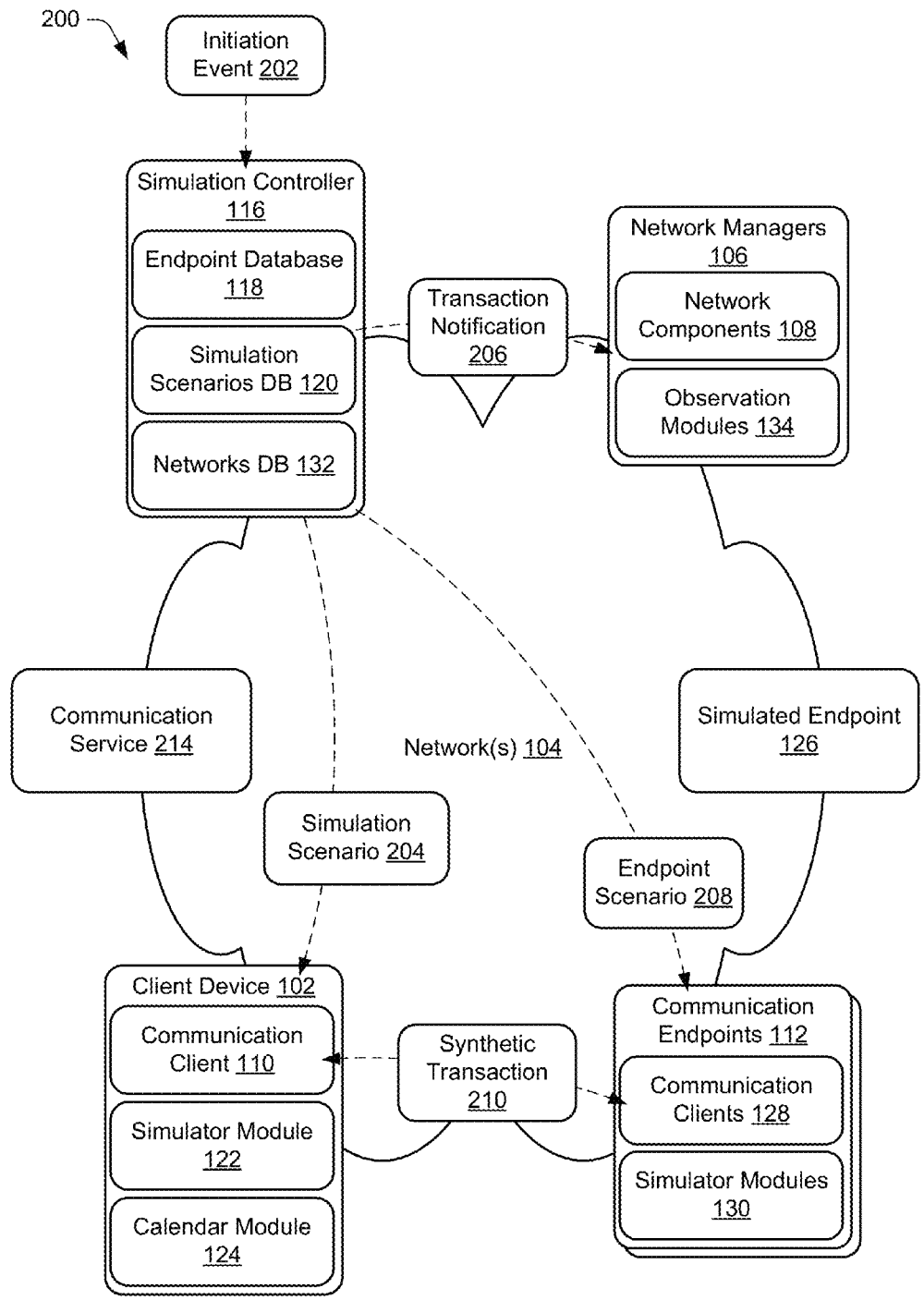
FIG. 2 illustrates an example implementation scenario for performing a synthetic transaction in accordance with one or more embodiments.

FIG. 2 illustrates an example implementation scenario 200 for performing a synthetic transaction in accordance with one or more implementations. In the scenario 200, the simulation controller 116 detects an initiation event 202 that indicates that a synthetic transaction is to be generated and performed. The initiation event 202 may correspond to various phenomena, such as user input to the simulation controller 116, an automatically generated event, a timed event, an indication of an upcoming scheduled communication session, and so forth. Generally, the initiation event 202 corresponds to a prompt to the simulation controller 116 to generate a simulation scenario.

In response to the initiation event 202, the simulation controller 116 generates a simulation scenario 204 that indicates various parameters to be applied and/or simulated as part of a synthetic transaction. Examples of different parameters are discussed above. The simulation scenario 204 may be generated in various ways, such as based on user input to the simulation controller 116, automatically in response to the initiation event 202, and so forth. In at least some implementations, the simulation scenario 204 may correspond to a preconfigured scenario from the simulation scenario DB 132. Alternatively or additionally, the simulation scenario 204 may be dynamically generated, such as based on a detected event or condition.

Continuing with the scenario 200, the simulation controller 116 communicates the simulation scenario 204 to the client device 102. The simulator module 122 parses the simulation scenario 204 to identify the various transaction parameters specified in the simulation scenario 204. The simulation scenario 204, for instance, identifies a specific instance or instances of the communication endpoints 112 with which the communication client 110 is to initiate a synthetic transaction.

According to various implementations, the simulation controller 116 also communicates a transaction notification 206 to particular network managers 106 that the simulation controller 116 determines may be involved in routing data as part of the synthetic transaction. The transaction notification 206, for instance, notifies the observation modules 134 for the respective networks 104 that a synthetic transaction is being initiated and that the observation modules 134 are to observe and record data flow behaviors for the synthetic transaction across respective network components 108. The transaction notification 206 includes various information that enables the observation modules 134 to distinguish data of the synthetic transaction from other data flows, such as identifiers for the client device 102 and the communication endpoint 112, a stream identifier that identifies data of the synthetic transaction (e.g., a packet identifier), and so forth.

Further to the scenario 200, the simulation controller 116 communicates an endpoint scenario 208 to a simulator module 122 of a communication endpoint 112 with which the synthetic transaction is to be initiated. The endpoint scenario 208, for instance, notifies the simulator module 130 that a synthetic transaction is being initiated between the client device 102 and the communication endpoint 112. For example, the endpoint scenario 208 identifies the client device 102 and indicates that the communication endpoint 112 will be receiving a communication from the client device 102, e.g., a request to initiate a communication session.

The endpoint scenario 208 may be a duplicate of the simulation scenario 204. For instance, the simulation scenario 204 may specify transaction parameters for the client device 102 and transaction parameters for the communication endpoint 112 to be applied as part of the synthetic transaction. Alternatively, the endpoint scenario 208 may be different than the simulation scenario 204 and may be generated specifically for the communication endpoint 112.

Further to the scenario 200, the simulator module 122 interacts with the communication client 110 to initiate a synthetic transaction 210 between the communication client 110 and the communication client 128 of the communication endpoint 112. The simulator module 122, for instance, simulates user input to the communication client 110 to initiate the synthetic transaction 210. In at least some implementations, the communication client 110 may be unaware that the synthetic transaction 210 is "synthetic" in that input received from the simulator module 122 simulates actual user input to the client device 102.

Generally, the synthetic transaction 210 represents an exchange of communication media between the client device 102 and the communication endpoint 112. The synthetic transaction 210, for instance, is a real-time exchange of communication media that simulates a real-time communication session between user of communication endpoints. The communication media may be included as part of the simulation scenario 204 and/or the endpoint scenario 208. Alternatively or additionally, the communication media may be generated by the client device 102 and/or the communication endpoint 112. Other parameters and behaviors specified by the simulation scenario 204 and the endpoint scenario 208 may be applied as part of the synthetic transaction 210, examples of which are detailed above.

According to various implementations, the scenario 200 may be employed to initiate a synthetic transaction between the client device 102 and the simulated endpoint 126, e.g., in addition or alternatively to the communication endpoint 112. For instance, the simulation scenario 204 may identify the simulated endpoint 126, such as via a network address and/or other identifier for the simulated endpoint 126. Thus, the client device 102 may initiate the synthetic transaction 210 with the simulated endpoint 126 in a similar manner as would be performed for initiating the synthetic transaction 210 with the communication endpoint 112. In at least some implementations, the simulation controller 116 may control the simulated endpoint 126 to simulate various endpoint behaviors. Alternatively or additionally, the simulated endpoint 126 may include integrated logic that enables the simulated endpoint 126 to control itself to simulate an interaction with an actual communication endpoint. Thus, the client device 102 may communicate with the simulated endpoint 126 as it would with an actual user-controlled communication endpoint 112.

Various behavioral data surrounding the synthetic transaction 210 is collected by entities involved in the synthetic transaction 210, as detailed below with reference to implementation scenario 400.

While the scenario 200 is discussed with reference to a synthetic transaction between two endpoints, it is to be appreciated that techniques discussed herein may be employed to initiate and perform synthetic transactions between many different devices. For instance, consider the following example scenario.

Figure 3:
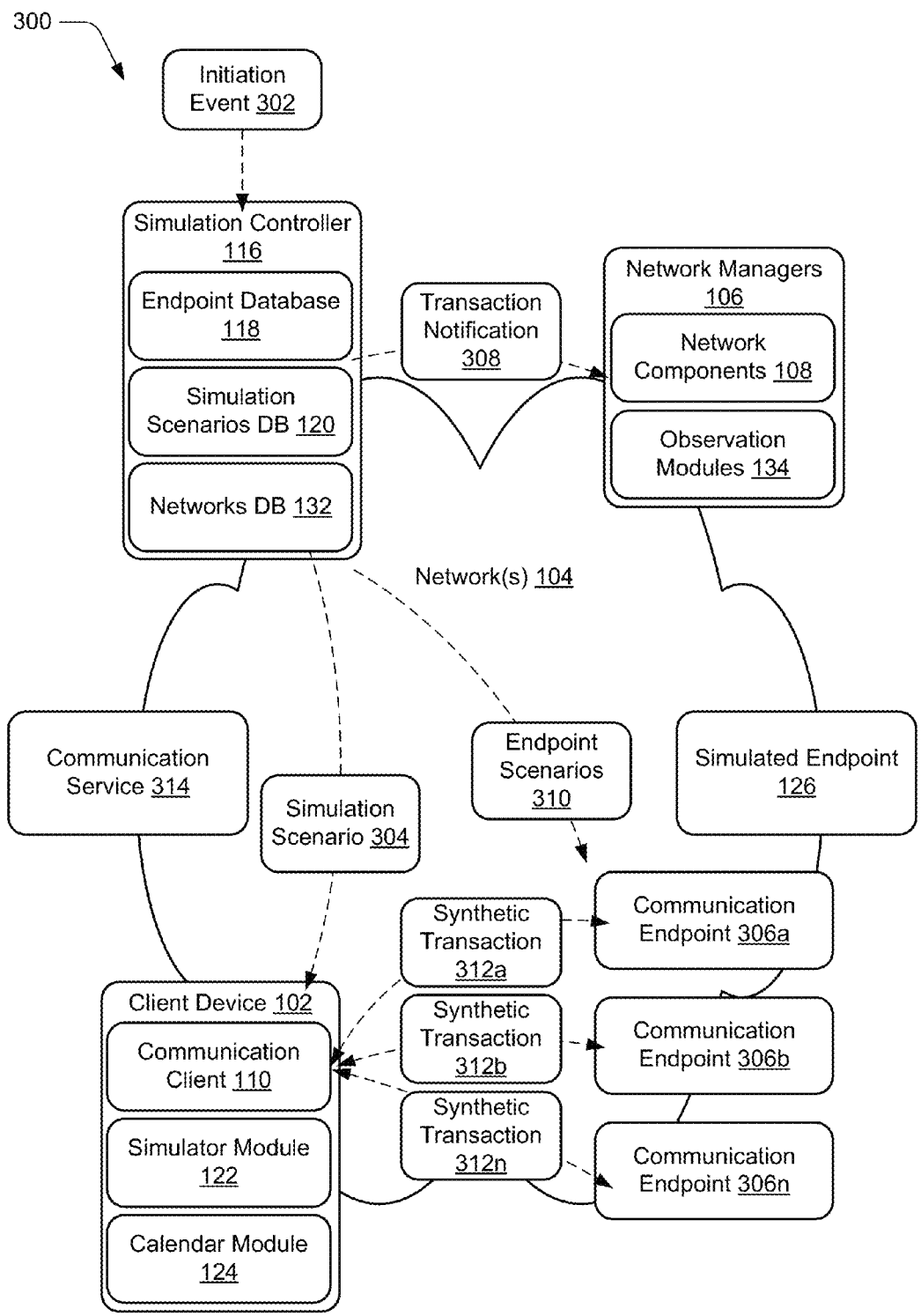
FIG. 3 illustrates an example implementation scenario for implementing a synthetic transaction between multiple different devices in accordance with one or more embodiments.

FIG. 3 illustrates an example implementation scenario 300 for implementing a synthetic transaction between multiple different devices. In the scenario 300, the simulation controller 116 detects an initiation event 302 that indicates that a synthetic transaction is to be generated and performed between the client device 102 and multiple communication endpoints. Various types of initiation events are discussed above.

In response to the initiation event 302, the simulation controller 116 generates a simulation scenario 304 that indicates various parameters for a synthetic transaction. Examples of different parameters are discussed above. The simulation scenario 304 specifies that synthetic transactions are to be implemented between the client device 102 and a communication endpoint 306a, a communication endpoint 306b, and a communication endpoint 306n. The communication endpoints 306a-306n each represent implementations of the communication endpoints 112 discussed above. Thus, although not expressly illustrated here, each of the communication endpoints 306a-306n include respective instances of the communication client 128 and the simulator module 130.

The simulation scenario 304 may be generated in various ways, such as based on user input to the simulation controller 116, automatically in response to the initiation event 302, and so forth. In at least some implementations, the simulation scenario 304 may correspond to a preconfigured scenario from the simulation scenarios DB 120. Alternatively or additionally, the simulation scenario 304 may be dynamically generated, such as based on a detected event or condition.

Continuing with the scenario 300, the simulation controller 116 communicates the simulation scenario 304 to the client device 102. The simulator module 122 parses the simulation scenario 304 to identify the various transaction parameters specified in the simulation scenario 304. The simulation scenario 304, for instance, identifies the communication endpoints 306a-306n.

According to various implementations, the simulation controller 116 also communicates a transaction notification 308 to particular network managers 106 that the simulation controller 116 determines may be involved in routing data as part of the synthetic transactions. The transaction notification 308, for instance, notifies the observation modules 134 for the respective networks 104 that synthetic transactions are being initiated and that the observation modules 134 are to observe and record data flow behaviors for the synthetic transactions across respective network components 108. The transaction notification 308 includes various information that enables the observation modules 134 to distinguish data of the synthetic transaction from other data flows, such as identifiers for the client device 102 and the communication endpoints 306a-306n, a stream identifier that identifies data of the respective synthetic transactions (e.g., packet identifiers), and so forth.

The simulation controller 116 also communicates endpoint scenarios 310 to simulator modules for the respective communication endpoints 306a-306n. Generally, the endpoint scenarios 310 specify various parameters to be applied by the communication endpoints 306a-306n as part of the synthetic transactions. The endpoint scenarios 310, for instance, may include media to be exchanged as part of the synthetic transactions. According to various implementations, the endpoint scenarios 310 may be duplicates, e.g., may each include the same information and attributes. Alternatively, at least some of the endpoint scenarios 310 may include different information and/or attributes than others of the endpoint scenarios 310. Thus, simulator modules for the respective communication endpoints 306a-306n parse the endpoint scenarios 310 to ascertain various parameters for a synthetic transaction.

Further to the scenario 300, the simulator module 122 interacts with the communication client 110 to initiate synthetic transactions 312a, 312b, 312n between the communication client 110 and communication clients of the respective communication endpoints 306a-306n. The simulator module 122, for instance, simulates user input to the communication client 110 to initiate the synthetic transactions 312a-312n. In at least some implementations, the communication client 110 may be unaware that the synthetic transactions 312a-312n are "synthetic" in that input received from the simulator module 122 simulates actual user input to the client device 102. Generally, the synthetic transactions 312a-312n may represent concurrent and/or simultaneous synthetic transactions.

The synthetic transactions 312a-312n represent an exchange of communication media between the client device 102 and the respective communication endpoints 306a-306n, e.g., according to media and attributes specified by the simulation scenario 304 and the respective endpoint scenarios 310.

While the scenario 300 is illustrated with reference to synthetic transactions between four communication endpoints (e.g., the client device 102 and the communication endpoints 306a-306n), it is to be appreciated that techniques may be employed to initiate concurrent synthetic transactions with many communication endpoints, e.g., hundreds, thousands, and so forth. For instance, the scenario 300 may be implemented as part of simulation of a conference call and/or a multicast communication event, such as a simulation of an enterprise meeting among multiple parties. In at least some implementations, the scenario 300 may be implemented to include a synthetic transaction between the client device 102 and the simulated endpoint 126, e.g., in addition to the communication endpoints 306a-306n.

Figure 4:
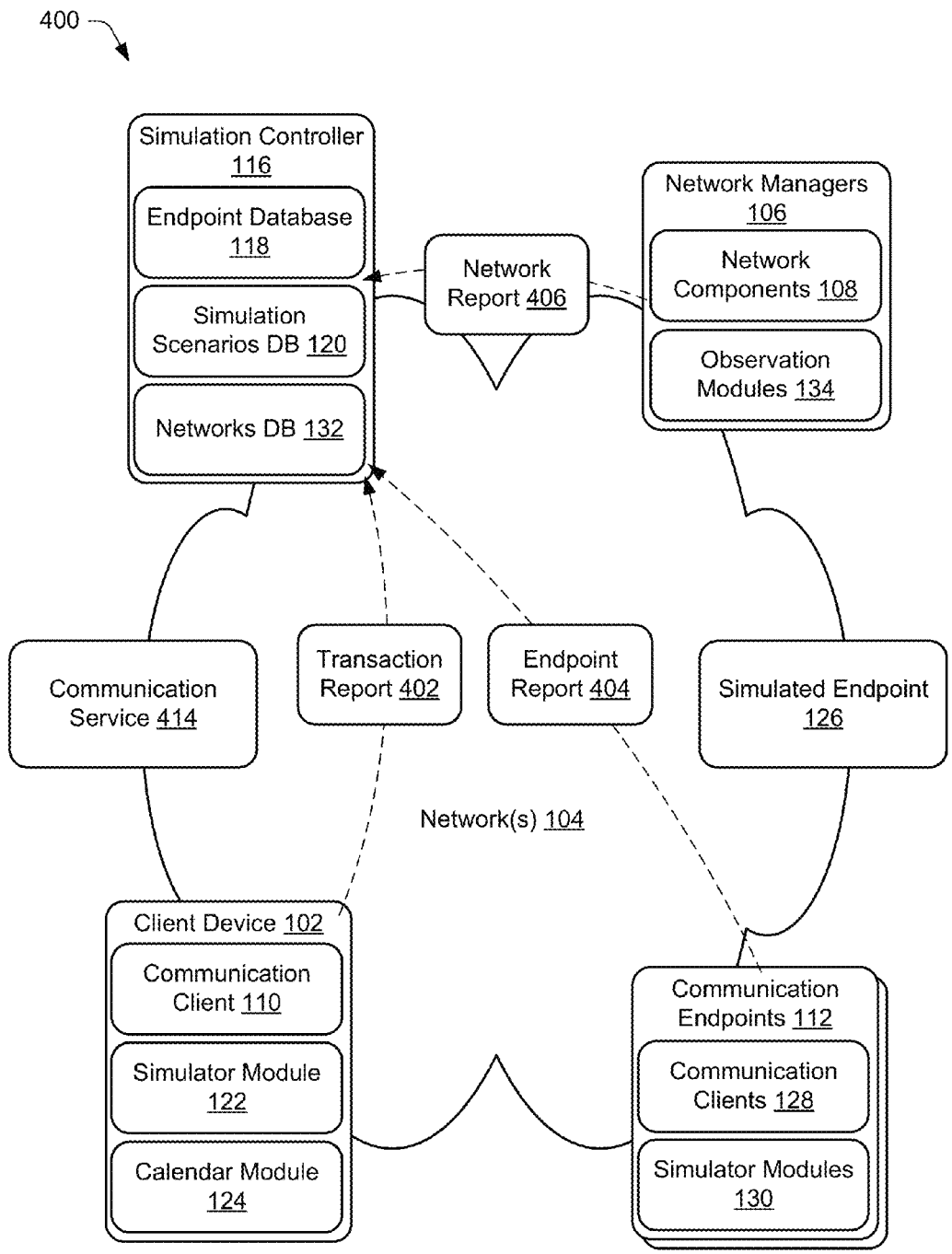
FIG. 4 illustrates an example implementation scenario for reporting behaviors and performance attributes that are observed as part of a synthetic transaction in accordance with one or more embodiments.

FIG. 4 illustrates an example implementation scenario 400 for reporting behaviors and performance attributes that are observed as part of a synthetic transaction in accordance with one or more implementations. In at least some implementations, the scenario 400 represents a continuation of the scenarios 200 and/or 300 discussed above.

In the scenario 400, the client device 102 communicates a transaction report 402 to the simulation controller 116. Generally, the transaction report 402 includes various behaviors and performance attributes that are observed as part of a synthetic transaction. Examples of behaviors and attributes specified in the transaction report 402 include queue handling, client device 102 configuration, data routing, failure handling attributes, jitter attributes, packet latency, packet loss, and so forth. The transaction report 402, for instance, can be populated with attributes and values based at least partially on the notification events and/or observations API discussed above.

According to various implementations, the transaction report 402 can be generated and communicated in various ways. For instance, the simulator module 122 can populate the transaction report 402 with different attributes and values during initiation, performance, and termination of a synthetic transaction. For instance, the client device 102 can communicate the transaction report 402 to the simulation controller 116 after termination of a synthetic transaction.

Alternatively or additionally, the transaction report 402 can be communicated to the simulation controller 116 dynamically and during different stages of a synthetic transaction, e.g., during initiation, performance, and/or termination of a synthetic transaction. For instance, different instances of the transaction report 402 can be communicated (e.g., periodically) to the simulation controller 116 at different points of a synthetic transaction, with individual transaction reports 402 being updated based on recently observed behaviors and attributes of a synthetic transaction.

Further to the scenario 400, the communication endpoint 112 communicates an endpoint report 404 to the simulation controller 116. According to various implementations, the endpoint report 404 includes various attributes and behaviors observed at the communication endpoint 112 as part of a synthetic transaction. The endpoint report 404, for example, may be populated and/or communicated similarly to the transaction report 402, but with values and attributes observed at the communication endpoint 112.

Continuing with the scenario 400, a network manager 106 communicates a network report 406 to the simulation controller 116. According to various implementations, the network report 406 includes various attributes and behaviors observed by the network manager 106 as part of a synthetic transaction. The network report 406, for example, may be populated and/or communicated similarly to the transaction report 402, but with values and attributes observed by the network manager 106. In implementations where multiple networks are involved in a synthetic transaction, individual network managers 106 for the involved networks may communicate individual respective network reports 406 that are populated with attributes and behaviors observed at the respective networks 104.

According to various implementations, the simulation controller 116 receives the different reports and processes the reports in various ways. For instance, information from the transaction report 402 and the endpoint report 404 can be propagated to the endpoint DB 118. An entry in the endpoint DB 118 for the client device 102 may be populated with information from the transaction report 402. Further, an entry in the endpoint DB 118 for the communication endpoint 112 may be populated with information from the endpoint report 404. Thus, the simulation controller 116 may track attributes and behaviors observed at different devices and/or endpoints as part of a synthetic transaction. Further, the endpoint DB 118 may be used to track historical performance of different devices and endpoints over multiple different synthetic transactions and over a period of time.

The simulation controller 116 also propagates information from the network report 406 to the networks DB 132. An entry in the networks DB 132 for the particular network 104 involved in the synthetic transaction may be populated with information from the network report 406. Thus, the simulation controller 116 may track attributes and behaviors observed at different networks 104 as part of a synthetic transaction. When multiple networks 104 are involved in a synthetic transaction, the simulation controller 116 may populate information from network reports 406 received from the different networks to entries in the networks DB 132 for the respective networks 104. In at least some implementations, the networks DB 132 may be used to track historical performance of different networks over multiple different synthetic transactions and over a period of time.

According to one or more implementations, the different reports generated as part of the scenario 400 are generated pursuant to a single synthetic transaction, synthetic transaction 210 discussed above with reference to FIG. 2. Thus, information from the different reports may be aggregated to present a comprehensive end-to-end perspective of a synthetic transaction.

In implementations where multiple synthetic transactions are performed concurrently (e.g., as discussed with reference to FIG. 3), reports generated based on the different synthetic transactions may be linked, e.g., based on a transaction identifier that links the different related synthetic transactions. Thus, information from the different linked reports may be aggregated to present an overall perspective of the related synthetic transactions.

Further to the scenario 400, information from the different reports may be propagated to different entities. For instance, the simulation controller 116 may notify different network managers 106 of behaviors and performance attributes observed at different devices and/or endpoints that utilized respective networks 104 for a synthetic transaction. Further, the client device 102 may be notified of network and/or endpoint behaviors and attributes. The communication endpoint 112 may also be notified of behaviors and attributes observed at respective networks 104 and the client device 102. Thus, end-to-end awareness of synthetic transaction behaviors and attributes enabled by techniques discussed herein may be disseminated to entities involved in synthetic transactions. Such awareness enables individual entities to repair and/or optimize components, settings, and/or processes to mitigate performance problems and increase performance quality in their respective spheres of responsibility.

Having discussed some example implementation scenarios, consider now a discussion of some example procedures in accordance with one or more embodiments.

Example Procedures

The following discussion describes some example procedures for synthetic transactions between communication endpoints in accordance with one or more embodiments. The example procedures may be employed in the environment 100 of FIG. 1, the system 1000 of FIG. 10, and/or any other suitable environment. The procedures, for instance, represent procedures for implementing the example implementation scenarios discussed above. In at least some embodiments, the steps described for the various procedures can be implemented automatically and independent of user interaction.

Figure 5:
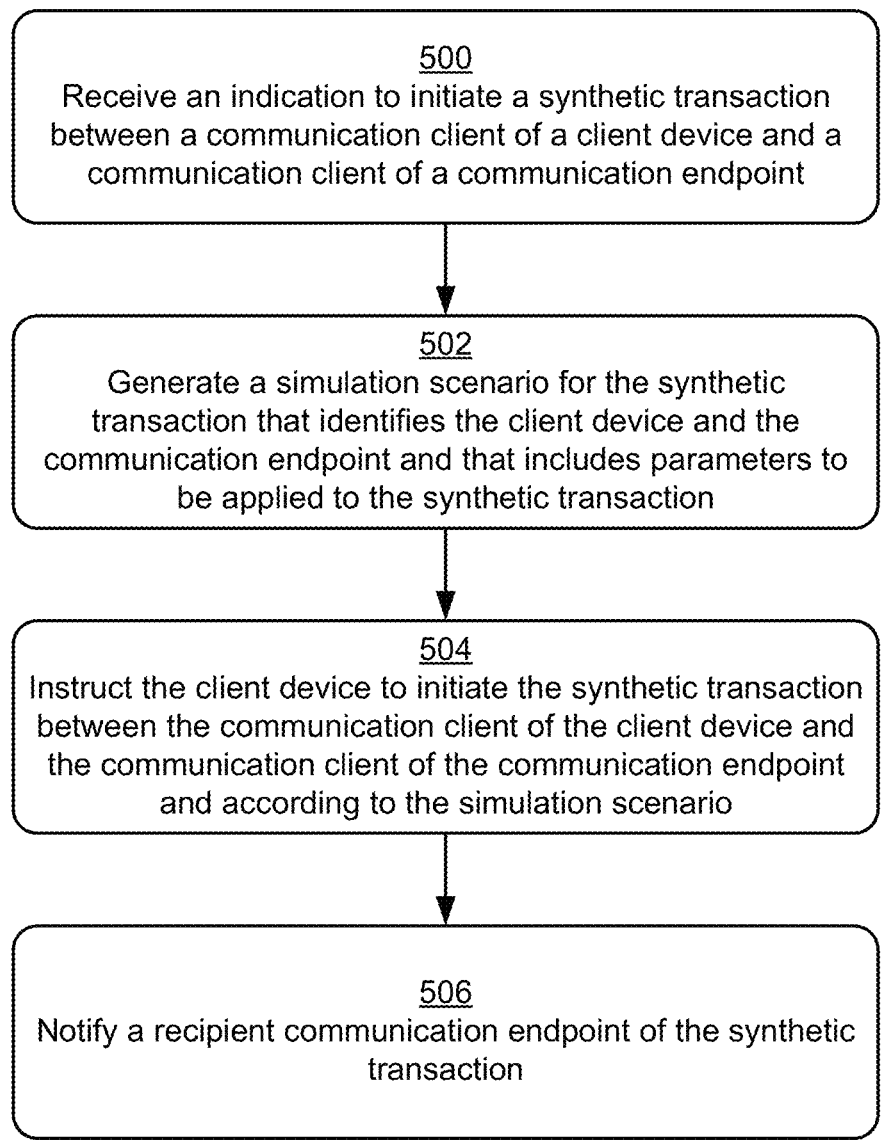
FIG. 5 is a flow diagram that describes steps in a method for initiating a synthetic transaction in accordance with one or more embodiments.

FIG. 5 is a flow diagram that describes steps in a method in accordance with one or more embodiments. The method describes an example procedure for initiating a synthetic transaction in accordance with one or more embodiments.

Step 500 receives an indication to initiate a synthetic transaction between a communication client of a client device and a communication client of a communication endpoint. According to various implementations, the indication can be received based on various events and conditions that occur. The indication, for instance, may include detecting an upcoming calendar event that will involve a communication session. In another example, a user may provide input to initiate a synthetic transaction. In at least some implementations, synthetic transactions may be scheduled to be performed automatically on a periodic basis, such as to test behaviors and attributes of communication lines.

Step 502 generates a simulation scenario for the synthetic transaction that identifies the client device and the communication endpoint, and that includes parameters to be applied to the synthetic transaction. Generally, the simulation scenario specifies various communication endpoints and devices that are to be involved in the synthetic transaction. The simulation scenario also specifies various parameters for the synthetic transaction, such as settings to be applied (e.g., device and/or communication client settings), type(s) of communication media to be exchanged, behaviors (e.g., user behaviors) to be simulated, timing parameters for the synthetic transaction, and so forth. In at least some implementations, a simulation scenario includes communication media to be exchanged as part of a synthetic transaction, such as voice data, video data, content, and so forth. Example parameters for simulation scenarios and synthetic transactions are discussed above.

Step 504 instructs the client device to initiate the synthetic transaction between the communication client of the client device and the communication client of the communication endpoint and according to the simulation scenario. Parameters of the simulation scenario, for instance, are communicated to a client device. In at least some implementations, a simulation controller communicates a notification to the client device to implement a synthetic transaction according to the simulation scenario.

Step 506 notifies a recipient communication endpoint of the synthetic transaction. For example, a notification that includes various attributes of the synthetic transaction is communicated to one or more communication endpoints with which the synthetic transaction is initiated. In at least some implementations, an endpoint scenario that specifies various endpoint-specific behaviors and transaction attributes is communicated to the communication endpoint. The endpoint scenario, for instance, may include communication media to be communicated by the recipient communication endpoint to an initiating device as part of the synthetic transaction.

Figure 6:
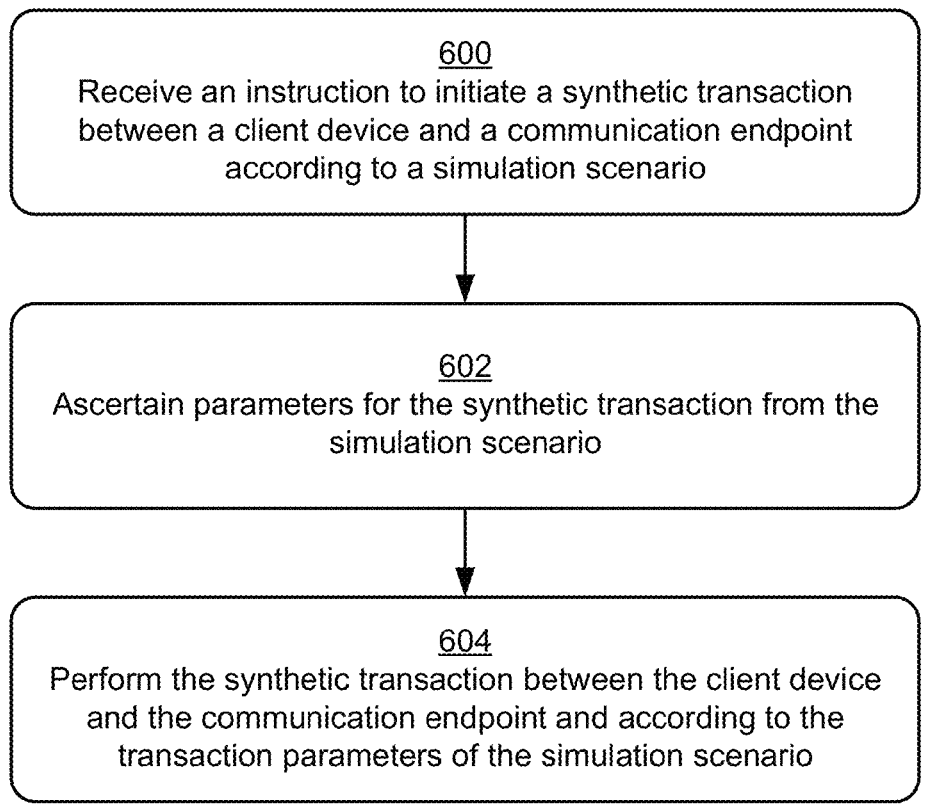
FIG. 6 is a flow diagram that describes steps in a method for performing a synthetic transaction in accordance with one or more embodiments.

FIG. 6 is a flow diagram that describes steps in a method in accordance with one or more embodiments. The method describes an example procedure for performing a synthetic transaction in accordance with one or more embodiments.

Step 600 receives an instruction to initiate a synthetic transaction between a client device and a communication endpoint according to a simulation scenario. The instruction, for instance, indicates an instruction to initiate the synthetic transaction between a communication client of the client device and a communication client of the communication endpoint. For example, a client device receives the instruction from a simulation controller. Alternatively or additionally, the instruction may be generated by a client device, e.g., by a device that is to initiate the synthetic transaction.

Step 602 ascertains parameters for the synthetic transaction from the simulation scenario. A client device, for instance, parses the simulation scenario to identify one or more communication endpoints with which the synthetic transaction is to be initiated. The client device may further identify various transaction parameters to be utilized for the synthetic transaction.

Step 604 performs the synthetic transaction between the client device and the communication endpoint and according to the transaction parameters of the simulation scenario. The synthetic transaction, for instance, is performed between the communication client of the client device and the communication client of the communication endpoint. For example, the client device communicates a request to the communication endpoint to initiate a communication session. In at least some implementations, the request may be implemented as a standard call request, such as to participate in a VoIP call and/or other communication session with the client device. The client device then exchanges communication media specified by and/or included in the simulation scenario with the communication endpoint. Various transaction parameters specified by the simulation scenario are also implemented, such as behaviors and events that are performed as part of the synthetic transaction. Examples of such transaction parameters are discussed above.

According to various implementations, the method may be performed to initiate multiple concurrent synthetic transactions with multiple different communication endpoints, such as part of a simulation of a multicast communication session from the client device to multiple different communication endpoints.

Figure 7:
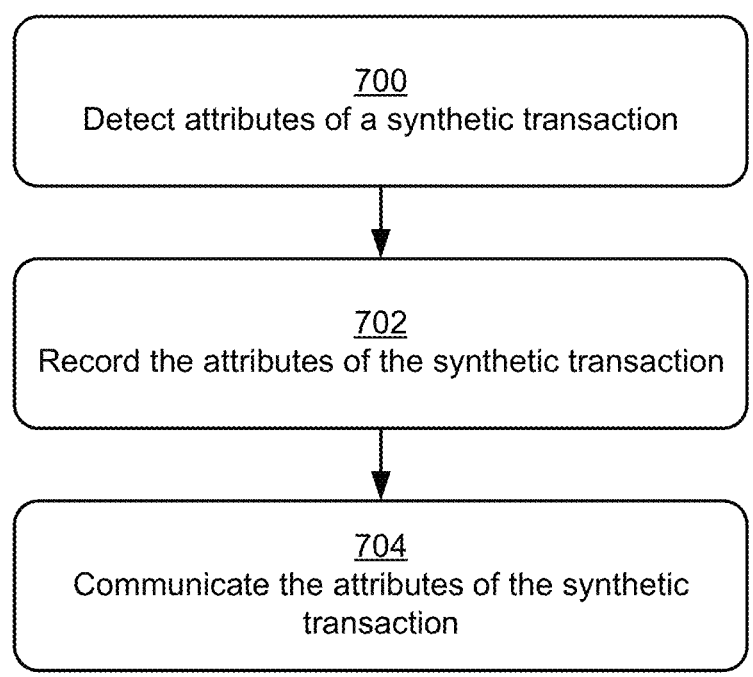
FIG. 7 is a flow diagram that describes steps in a method for logging attributes of a synthetic transaction in accordance with one or more embodiments.

FIG. 7 is a flow diagram that describes steps in a method in accordance with one or more embodiments. The method describes an example procedure for logging attributes of a synthetic transaction in accordance with one or more embodiments. In at least some implementations, the method describes an example extension of the method discussed above with reference to FIG. 6. The method may be performed by various entities involved and/or associated with a synthetic transaction, such as a communication endpoint, a simulation controller, a network manager, and so forth.

Step 700 detects attributes of a synthetic transaction. Generally, the attributes include behaviors and events that occur during the synthetic transaction, such as simulated user input, machine generated events, and so forth. According to various implementations, the attributes also include performance attributes, such as bandwidth experienced during the synthetic transaction, packet latency, jitter, delay, and so forth. The attributes may be detected at various points of a synthetic transaction, such as at initiation, performance, and termination of the synthetic transaction.

In at least some implementations, detected attributes may include media quality attributes, such attributes related to user experience as part of a communication session. Examples of media quality attributes include sound quality, voice intelligibility, video quality, synchronization quality among media types and/or communication endpoints, and so forth.

Step 702 records the attributes of the synthetic transaction. The attributes, for instance, are logged along with a transaction identifier that differentiates the synthetic transaction from other synthetic transactions and/or communication sessions. The attributes may also be timestamped to indicate a time during the synthetic transaction when the individual attributes were detected. The attributes, for instance, may be tagged as being detected at initiation, performance, or termination of a synthetic transaction.

Step 704 communicates the attributes of the synthetic transaction. The attributes, for instance, may be communicated to various entities, such as entities involved in the synthetic transaction. In at least some implementations, the attributes may be communicated via the notification events and/or the observations API discussed above.

In at least some implementations, techniques discussed herein can be used to test changes that are made in response to detected attributes of a synthetic transaction. For instance, device and/or network attributes can be changed to repair and/or optimize communication performance and based on performance problems detected during a synthetic transaction. After the attributes are changed, the synthetic transaction can be performed again to ascertain whether the changes were effective to repair and/or optimize communication performance.

Figure 8:
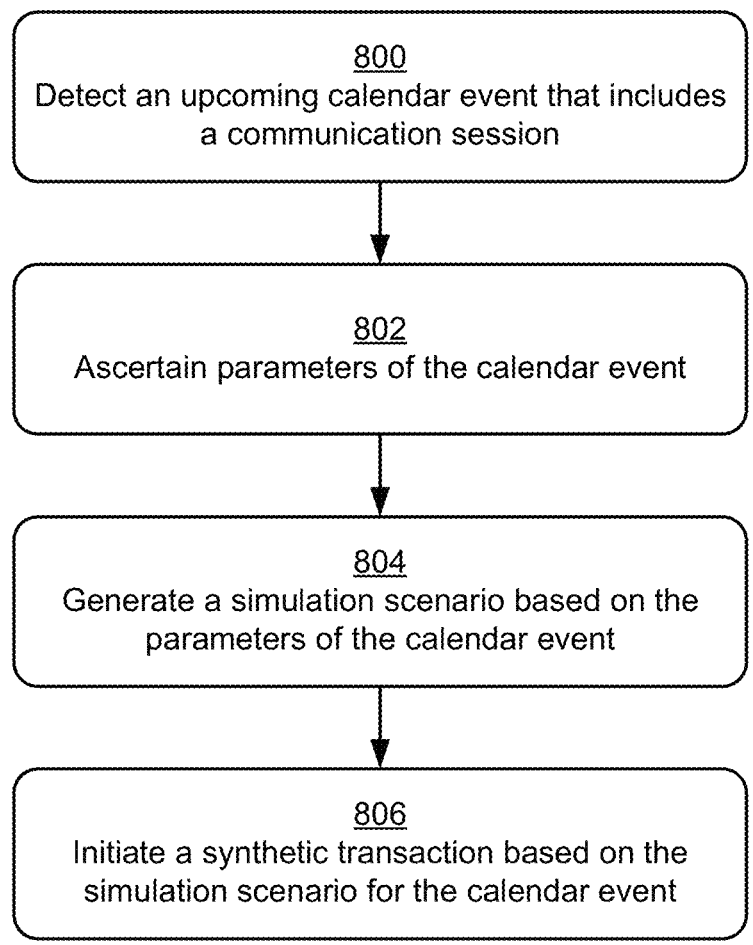
FIG. 8 is a flow diagram that describes steps in a method for triggering initiation of a synthetic transaction in accordance with one or more embodiments.

FIG. 8 is a flow diagram that describes steps in a method in accordance with one or more embodiments. The method describes an example procedure for triggering initiation of a synthetic transaction in accordance with one or more embodiments. In at least some implementations, the method describes an example implementation of step 500 discussed above with reference to FIG. 5.

Step 800 detects an upcoming calendar event that includes a communication session. The calendar event, for instance, may include a teleconference, a video conference, a UC session, and so forth. The calendar event may be detected in various ways. For instance, with reference to the environment 100, the simulator module 122 may detect the calendar event from the calendar module 124. The calendar event may be detected, for example, based on a query to and/or a notification from the calendar module 124 identifying the calendar event.

Step 802 ascertains parameters of the calendar event. Data for the calendar event, for instance, may identify communication endpoints involved in the communication session, date and time parameters for the communication session, media types to be exchanged during the communication session, and so forth.

Step 804 generates a simulation scenario based on the parameters of the calendar event. The simulation scenario, for instance, may identify various communication endpoints involved in the calendar event, such as an initiating device, recipient device(s), and so forth. Various other examples of transaction parameters are discussed above.

Step 806 initiates a synthetic transaction based on the simulation scenario for the calendar event. The synthetic transaction, for instance, may be scheduled to be initiated at a particular time prior to the calendar event, e.g., an hour before, 30 minutes before, and so forth. Thus, the synthetic transaction may be performed to test performance attributes for entities involved in the calendar event, such as communication endpoints, networks and network components, and so forth.

In at least some implementations, attributes of the synthetic transaction may be reported to various entities, such as discussed above with reference to FIG. 7. For instance, if performance problems (e.g., errors and/or poor communication performance) are detected during the synthetic transaction, various corrective actions can be taken prior to the actual calendar event to mitigate the performance problems and increase the quality of the associated communication session.

Figure 9:
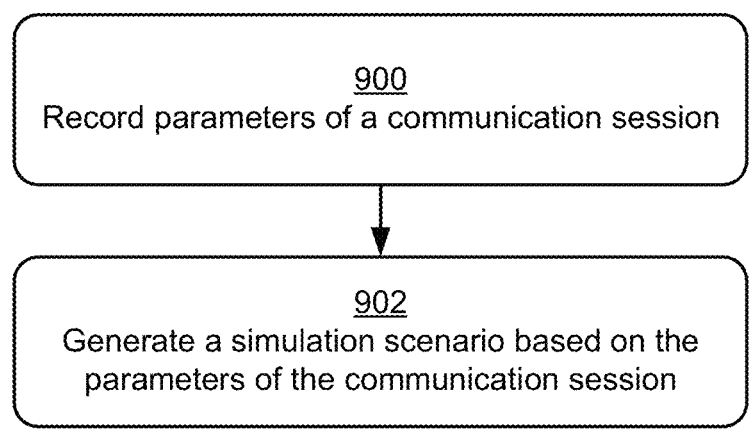
FIG. 9 is a flow diagram that describes steps in a method for generating a simulation scenario in accordance with one or more embodiments.

FIG. 9 is a flow diagram that describes steps in a method in accordance with one or more embodiments. The method describes an example procedure for generating a simulation scenario based on an actual communication session in accordance with one or more embodiments.

Step 900 records parameters of a communication session. Generally, the communication session represents an exchange of communication media between different endpoints as part of interaction between different users. The communication session, for instance, is user-initiated and does not correspond to a synthetic transaction.

Step 902 generates a simulation scenario based on the parameters of the communication session. The simulation scenario, for instance, identifies endpoints involved in the communication session, media types exchanged during the communication session, user input provided during the communication session, networks and network components involved in the communication session, device behaviors and events that occurred during the communication session, settings in effect during the communication session, and so forth. The simulation scenario, for instance, recreates events and behaviors that occurred during the communication session.

According to various implementations, this method may be performed in response to detecting that a problem occurred during the communication session, such as a session error, poor communication performance, and so forth. Thus, the simulation scenario may be used to implement a synthetic transaction that simulates the original communication session. Performance attributes of the synthetic transaction can be detected and used to identify a source of the problem that occurred during the communication session.

Having discussed some example procedures, consider now a discussion of an example system and device in accordance with one or more embodiments.

Example System and Device

Figure 10:
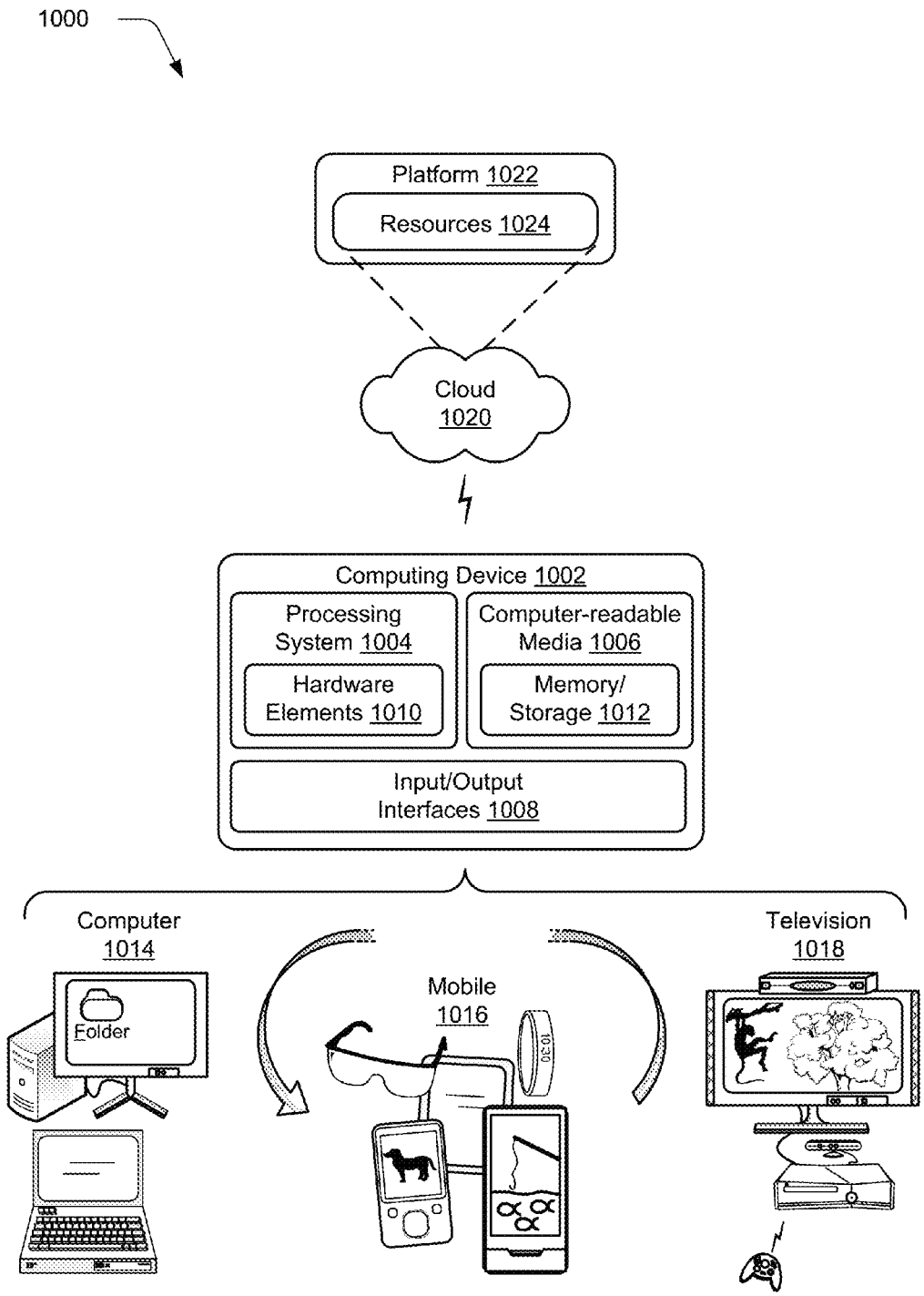
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client device 102 and/or the communication endpoints 112 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware.

Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, wearable devices, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the entities of the environment 100 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for synthetic transactions between communication endpoints are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:

at least one processor; and one or more computer-readable hardware memories including instructions stored thereon that, responsive to execution by the at least one processor, cause the at least one processor to perform operations including: receiving an instruction to initiate a synthetic transaction between a communication client of a client device and a communication client of a communication endpoint and according to a simulation scenario, the simulation scenario simulating one or more communication session types; ascertaining parameters of the synthetic transaction from the simulation scenario, the parameters including one or more identifiers of one or more communication endpoints with which the synthetic transaction is to be performed and transaction parameters to be applied as part of the synthetic transaction; receiving an instruction to initiate a synthetic transaction between a communication client of a client device and a communication client of a communication endpoint and according to a simulation scenario, the simulation scenario simulating one or more communication session types; ascertaining parameters of the synthetic transaction from the simulation scenario, the parameters including one or more identifiers of one or more communication endpoints with which the synthetic transaction is to be performed and transaction parameters to be applied as part of the synthetic transaction; receiving an instruction to initiate a synthetic transaction between a communication client of a client device and a communication client of a communication endpoint and according to a simulation scenario, the simulation scenario simulating one or more communication session types; ascertaining parameters of the synthetic transaction from the simulation scenario, the parameters including one or more identifiers of one or more communication endpoints with which the synthetic transaction is to be performed and transaction parameters to be applied as part of the synthetic transaction.

2. A system as recited in claim 1, wherein the instruction to initiate the synthetic transaction is received in response to detecting an upcoming calendar event that involves a communication session with the client device, and wherein the transaction parameters simulate one or more parameters of the communication session.

3. A system as recited in claim 1, wherein the instruction to initiate the synthetic transaction is received from an entity remote from the client device.

4. A system as recited in claim 1, wherein the simulation scenario is a simulation of a previously-recorded communication session.

5. A system as recited in claim 1, wherein the operations further include: receiving a further instruction to initiate a further synthetic transaction between the communication client of the client device and a communication client of at least one other communication endpoint concurrently with the synthetic transaction between the communication client of the client device and the communication client of the communication endpoint; and performing the synthetic transaction between the communication client of the client device and the communication client of the communication endpoint concurrently with performing the further synthetic transaction between the communication client of the client device and the communication client of the at least one other communication endpoint.

6. A system as recited in claim 5, wherein the at least one other communication endpoint comprises multiple different communication endpoints, and wherein the further synthetic transaction comprises a simulation of a multicast communication session initiated by the client device to the multiple different communication endpoints.

7. A system as recited in claim 1, wherein the operations further include: detecting the attributes of the synthetic transaction, the attributes including performance attributes of the synthetic transaction; and recording the attributes of the synthetic transaction.

8. A system as recited in claim 1, wherein said performing the synthetic transaction comprises exchanging the communication media between the communication client of the client device and the communication client of the communication endpoint.

9. A system as recited in claim 1, wherein the communication endpoint comprises a simulated communication endpoint that is a logical representation of an end-user device.

10. A computer-implemented method, comprising: receiving an indication to initiate a synthetic transaction between a communication client of a client device and a communication client of a communication endpoint; generating a simulation scenario for the synthetic transaction, the simulation scenario simulating one or more communication session types by at least identifying the client device and the communication endpoint and including parameters to be applied to the synthetic transaction, the synthetic transaction simulating an exchange of communication media including one or more of voice media or video media between the client device and the communication endpoint; instructing the client device to initiate the synthetic transaction between the communication client of the client device and the communication client of the communication endpoint and according to the simulation scenario; and determining communication quality between the client device and the communication endpoint based on attributes observed as part of the synthetic transaction, the attributes including one or more quality attributes of the voice media or the video media detected as part of the synthetic transaction.

11. A method as described in claim 10, wherein the indication is received further to a periodically scheduled synthetic transaction between the communication client of the client device and the communication client of the communication endpoint.

12. A method as described in claim 10, wherein said receiving comprises: detecting an upcoming calendar event that includes a communication session; and ascertaining parameters of the calendar event, wherein said generating comprises generating the simulation scenario based at least in part on the parameters of the calendar event.

13. A method as described in claim 12, wherein said instructing comprises instructing the client device to initiate the synthetic transaction prior to the calendar event.

14. A method as described in claim 10, wherein said generating comprises generating the simulation scenario to simulate a previously-recorded communication session.

15. A method as described in claim 10, further comprising: receiving an indication to initiate a further synthetic transaction between the communication client of the client device and one or more communication clients of one or more other communication endpoints; generating a further simulation scenario for the further synthetic transaction that identifies the client device and the one or more other communication endpoints, and that includes parameters to be applied to the further synthetic transaction; and instructing the client device to initiate the further synthetic transaction concurrently with the synthetic transaction between the communication client of the client device and the communication client of the communication endpoint.

16. A method as described in claim 15, wherein the synthetic transaction and the further synthetic transaction represent at least one of: a simulation of a multicast communication session from the client device to multiple communication endpoints; or a simulation of a conference call between the client device and multiple communication endpoints.

17. A method as described in claim 10, further comprising: recording the attributes of the synthetic transaction; and communicating the attributes to one or more entities involved in the synthetic transaction.

18. A computer-implemented method, comprising: receiving an indication to initiate a synthetic transaction between a communication client of a client device and a communication client of a simulated communication endpoint; generating a simulation scenario for the synthetic transaction that identifies the client device and the simulated communication endpoint, and that includes parameters to be applied to the synthetic transaction, the synthetic transaction simulating an exchange of communication media including one or more of voice media or video media between the client device and the simulated communication endpoint; and instructing the client device to initiate the synthetic transaction between the communication client of the client device and the communication client of the simulated communication endpoint and according to the simulation scenario.

19. A method as described in claim 18, wherein the simulated endpoint is a logic representation of an end-user device that is configured to engage in the synthetic transaction independent of user input.

20. A method as described in claim 18, wherein the simulation scenario includes a simulation of a previously-recorded communication session between the client device and a communication endpoint.

\* \* \* \* \*